(12) United States Patent
Molander et al.

(10) Patent No.: US 8,799,807 B2
(45) Date of Patent: Aug. 5, 2014

(54) ORGANIZATION AND DISPLAY OF TABS AND TAB GROUPS OVER HIERARCHICAL LEVELS

(75) Inventors: Mark E. Molander, Cary, NC (US); Thomas Brugler, Fuquay-Varina, NC (US); Randall A. Craig, Raleigh, NC (US); Vincent C. Conzola, Raleigh, NC (US); Todd M. Eischeid, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/249,244

(22) Filed: Sep. 30, 2011

(65) Prior Publication Data

US 2013/0086506 A1     Apr. 4, 2013

(51) Int. Cl.
*G06F 3/048*     (2013.01)
*G06F 17/30*     (2006.01)
*G06F 3/0482*    (2013.01)

(52) U.S. Cl.
CPC .......... *G06F 3/048* (2013.01); *G06F 17/30286* (2013.01); *G06F 3/0482* (2013.01); *G06F 17/30312* (2013.01); *G06F 17/30572* (2013.01)
USPC ............................ 715/777; 715/853; 715/854

(58) Field of Classification Search
CPC . G06F 3/048; G06F 3/0482; G06F 17/30286; G06F 17/30312; G06F 17/30572
USPC .......................................... 715/777, 854, 855
See application file for complete search history.

(56) References Cited

U.S. PATENT DOCUMENTS

| | | | | |
|---|---|---|---|---|
| 6,002,398 | A * | 12/1999 | Wilson | 715/777 |
| 7,360,170 | B1 * | 4/2008 | Giormov et al. | 715/804 |
| 7,707,505 | B1 * | 4/2010 | Ohrt et al. | 715/738 |
| 7,793,226 | B2 | 9/2010 | Sorenson et al. | |
| 7,921,365 | B2 | 4/2011 | Sauve et al. | |
| 2003/0085931 | A1 * | 5/2003 | Card et al. | 345/853 |
| 2006/0206866 | A1 * | 9/2006 | Eldrige et al. | 717/122 |
| 2006/0224944 | A1 * | 10/2006 | Baek et al. | 715/501.1 |
| 2007/0250505 | A1 * | 10/2007 | Yang et al. | 707/7 |
| 2007/0250822 | A1 * | 10/2007 | Yang et al. | 717/143 |
| 2008/0005686 | A1 * | 1/2008 | Singh | 715/764 |
| 2008/0082935 | A1 * | 4/2008 | Relyea et al. | 715/777 |
| 2009/0327947 | A1 * | 12/2009 | Schreiner et al. | 715/777 |
| 2010/0070928 | A1 * | 3/2010 | Goodger et al. | 715/838 |
| 2010/0107108 | A1 * | 4/2010 | Husoy et al. | 715/777 |

(Continued)

OTHER PUBLICATIONS

Noobieinc, "Using Tabs in Internet Explorer 7", May 28, 2008, retrieved on Aug. 6, 2013, retrieved from Internet <http://www.youtube.com/watch?v=PC6flwPVMKg>, total time: 3:09.*

(Continued)

*Primary Examiner* — Patrick Riegler
*Assistant Examiner* — Nicholas Klicos
(74) *Attorney, Agent, or Firm* — Jennifer M. Anda

(57) ABSTRACT

Tabs of a computer program running on a computing device, and tab groups, are organized over hierarchical levels. A lowest hierarchical level corresponds to the tabs, a second lowest hierarchical level corresponds to one or more of the tab groups that each directly encompass one or more of the tabs, and a highest hierarchical level corresponds to one or more of the tab groups that each directly encompass one or more other of the tab groups. Tab headers are displayed in accordance with the hierarchical levels. Each tab header corresponding to one of the tabs or one of the tab groups.

12 Claims, 8 Drawing Sheets

(56) References Cited

U.S. PATENT DOCUMENTS

| | | |
|---|---|---|
| 2010/0115451 A1* | 5/2010 | Moore et al. .................. 715/777 |
| 2010/0157359 A1* | 6/2010 | Steiner et al. ................ 358/1.15 |
| 2010/0161694 A1 | 6/2010 | Sudhi |
| 2010/0180225 A1* | 7/2010 | Chiba et al. .................. 715/777 |
| 2011/0138313 A1* | 6/2011 | Decker et al. ................. 715/777 |

OTHER PUBLICATIONS

J. Mellor, "Efficient browsing: putting it all together," accessed from Internet web site http://www.slideshare.net/jomel/efficient-browsing-putting-it-all-together, dated Jun. 2009.

\* cited by examiner

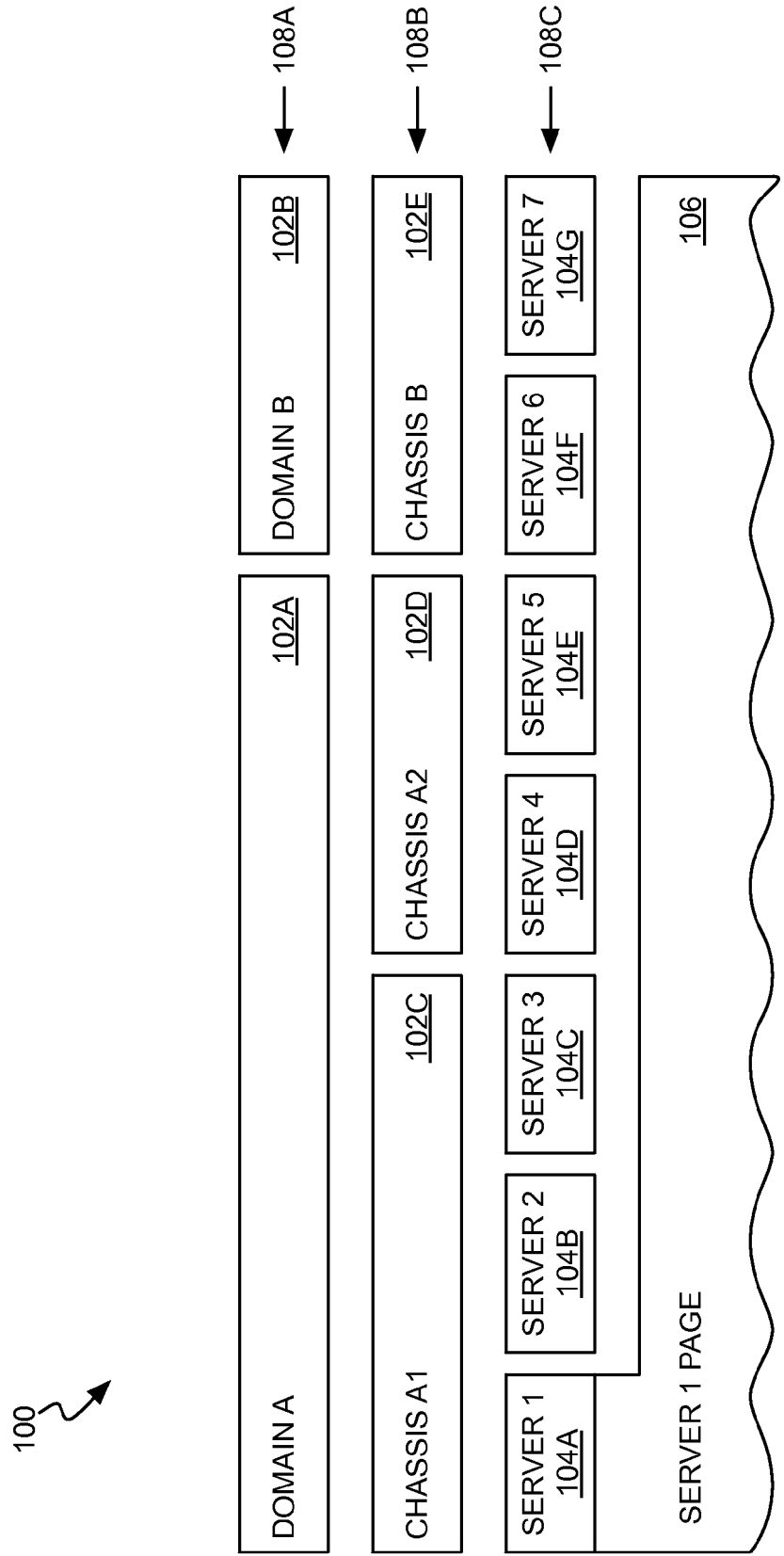

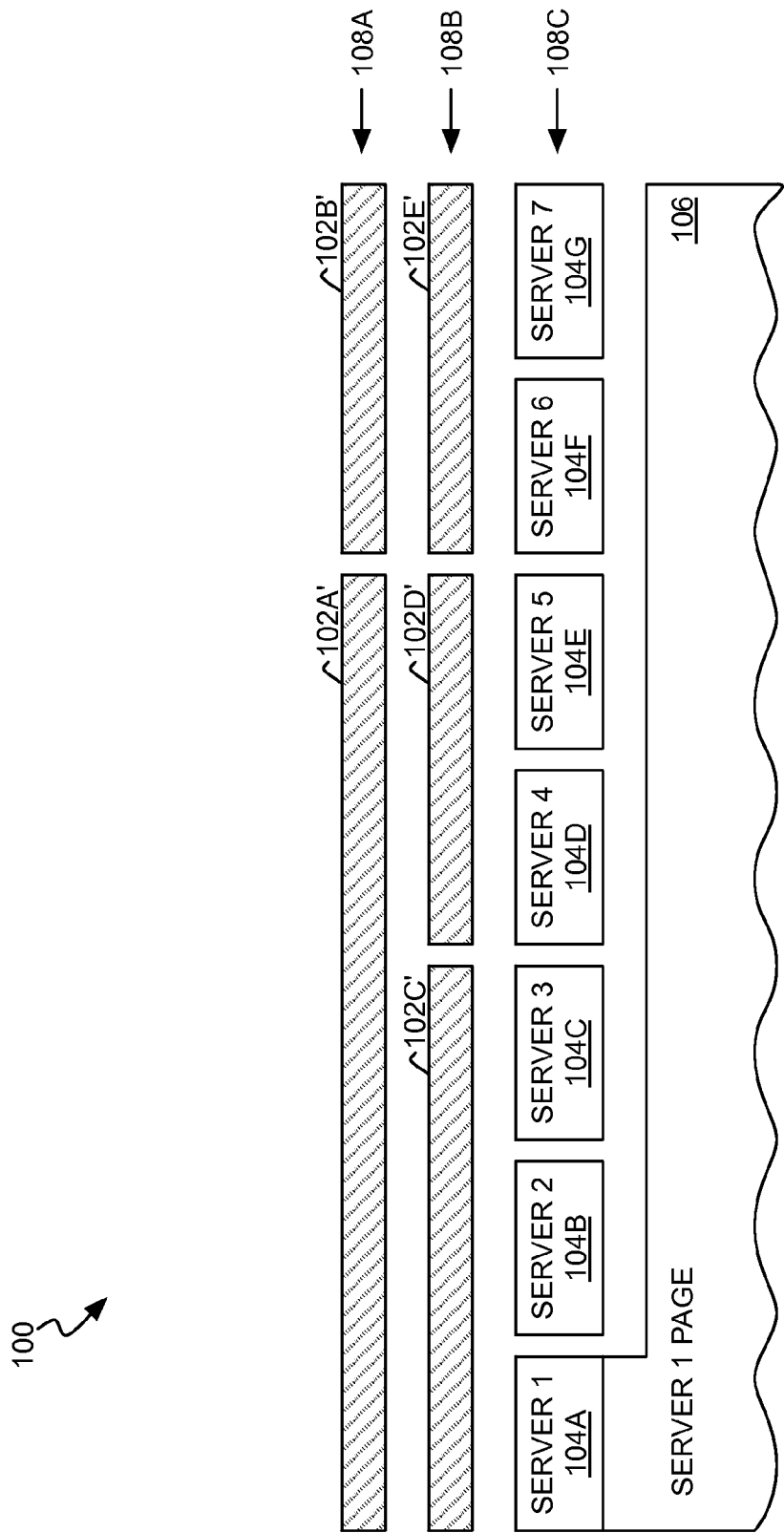

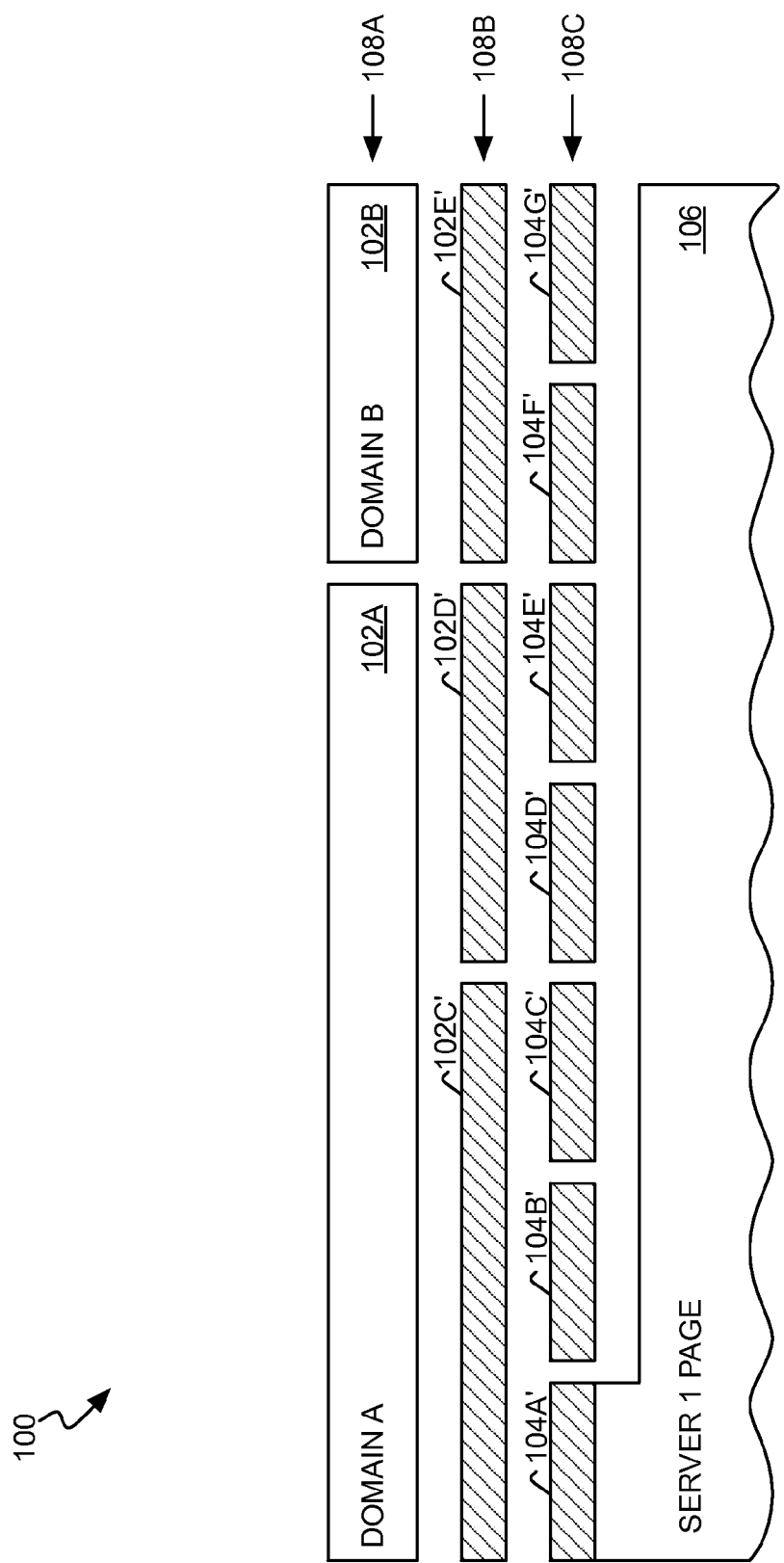

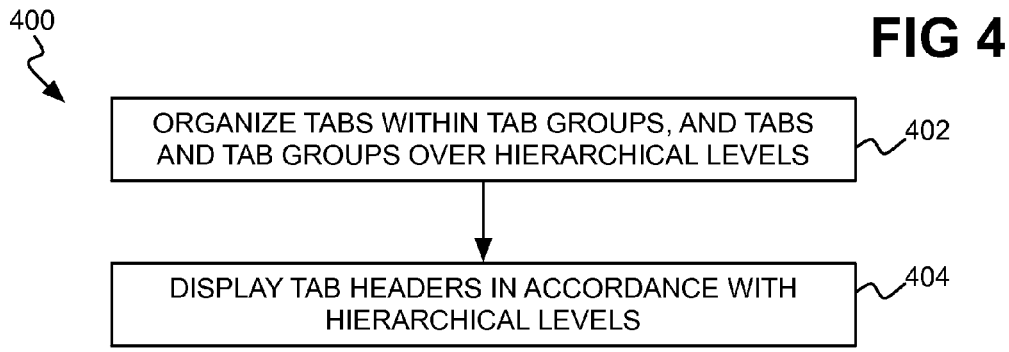
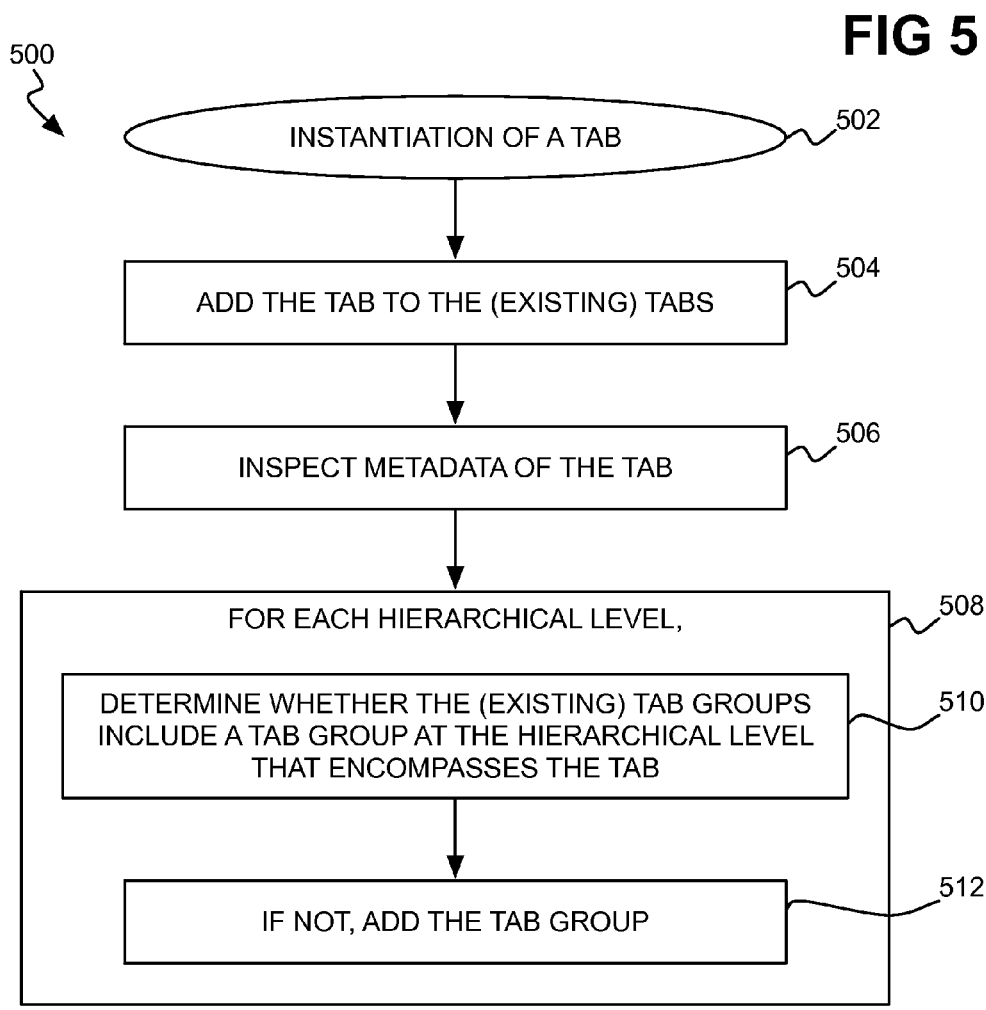

ORGANIZATION AND DISPLAY OF TABS AND TAB GROUPS OVER HIERARCHICAL LEVELS

BACKGROUND

Many types of computer programs, including operating systems, and application programs like web-browsing programs as well as systems management programs, rely on the use of tabs. For instance, a web-browsing program may permit a user to have multiple tabs open, each of which corresponds to a different web page to which the user has browsed. It is not uncommon for users to have tens or even hundreds of open tabs at the same time in a given computer program.

SUMMARY

A method of an embodiment of the invention includes organizing, by a computing device, tabs of a computer program running on the computing device and tab groups over three or more hierarchical levels. A lowest hierarchical level corresponds to the tabs, a second lowest hierarchical level corresponds to one or more of the tab groups that each directly encompass one or more of the tabs, and a highest hierarchical level corresponds to one or more of the tab groups that each directly encompass one or more other of the tab groups. The method includes displaying, by the computing device, tab headers in accordance with the hierarchical levels. Each tab header corresponds to one of the tabs or one of the tab groups.

A computing device of an embodiment of the invention includes a processor, and a computer-readable data storage medium to store a computer program executable by the processor and having tabs. The computing device includes a tab organization mechanism to, for each tab, inspect metadata of the tab. The metadata identifies, for each of a number of hierarchical levels except a lowest hierarchical level, a given tab group at the hierarchical level and that encompasses directly or indirectly the tab. The tab organization mechanism is to determine whether a number of tab groups include the given tab group at the hierarchical level and that encompasses directly or indirectly the given tab. The tab organization mechanism is to, where the tab groups do not include the given tab group, add the given tab group to the tab groups. The lowest hierarchical level corresponds to the tabs, and a highest hierarchical level corresponds to one or more of the tab groups that each directly encompass one or more other of the tab groups.

A computer program product of an embodiment of the invention includes a computer-readable storage medium having computer-readable code embodied therein. The computer-readable code is executable by a processor of a computing device on which a computer program having a number of tabs is running. The computer-readable code includes display computer-readable code to display tab headers in accordance with three or more hierarchical levels. Each tab header corresponds to one of a number of tabs or one of a number of tab groups. The tabs and the tab groups are organized over the hierarchical levels. A lowest hierarchical level corresponds to the tabs, a second lowest hierarchical level corresponds to one or more of the tab groups that each directly encompass one or more of the tabs, and a highest hierarchical level corresponds to one or more of the tab groups that each directly encompass one or more other of the tab groups.

BRIEF DESCRIPTION OF THE SEVERAL VIEWS OF THE DRAWINGS

The drawings referenced herein form a part of the specification.

Features shown in the drawing illustrate only some embodiments of the disclosure, and not of all embodiments of the disclosure, unless the detailed description explicitly indicates otherwise, and readers of the specification should not make implications to the contrary.

FIGS. 1, 2, and 3 are diagrams of example graphical user interfaces (GUIs) including tabs and tab groups organized over hierarchical levels, according to varying embodiments of the invention.

FIG. 4 is a flowchart of a method, according to an embodiment of the invention.

FIGS. 5, 6, and 7 are flowcharts of methods for organizing tabs within tab groups and for organizing tabs and tab groups over hierarchical levels, according to varying embodiments of the invention.

DETAILED DESCRIPTION

Figure 6:
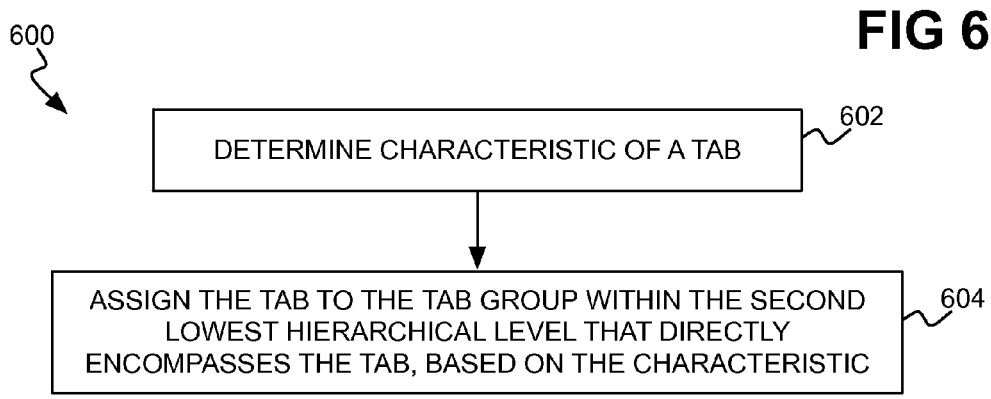

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, many types of computer programs use tabs, where it is not uncommon for users to have tens or even hundreds of open tabs at the same time in a given computer program. A difficulty with this situation is how to organize the tabs. For instance, web-browsing programs typically open tabs at the far right of an existing window, or to the immediate right of the current tab that in relation to which a new tab is opened. As such, it may become difficult for users to quickly discern which tabs they have open, and to quickly locate a tab of interest.

Disclosed herein are techniques to meaningfully and dynamically organize and display tabs and tab groups over hierarchical levels to address these and other issues. Tabs and tab groups are organized over three or more hierarchical levels in one embodiment. The lowest hierarchical level corresponds to the tabs themselves, and the second lowest hierarchical level corresponds to one or more of the tab groups that each directly encompass one or more of the tabs. The highest hierarchical level corresponds to one or more of the tab groups that each directly encompass one or more other of the tab groups. Tab headers are displayed in accordance with the hierarchical levels. Each tab header corresponds to one of the tabs or to one of the tab groups.

FIGS. 1, 2, and 3 show a number of examples of such techniques to organize and display tabs and tab groups over hierarchical levels, according to varying embodiments of the invention. The examples pertain to a computer program that is specifically a systems management program. The systems management program can permit a user to manage multiple servers, or other resources, where each server or other resource is located in a chassis, and chasses are grouped by domains.

However, in other examples, the computer program in question may be an operating system, or an application program other than a systems management program, such as a web-browsing program. Furthermore, while a number of different and separate examples are shown in and described in relation to FIGS. 1, 2, and 3, the examples can be combined in various ways. That is, different embodiments of the invention may employ different parts of different ones of the examples.

Referring first to FIG. 1, a graphical user interface (GUI) 100 includes tab groups 102A, 102B, 102C, 102D, and 102E, collectively referred to as the tab groups 102, and tabs 104A, 104B, 104C, 104D, 104E, 104F, and 104G, collectively referred to as the tabs 104. The tabs 104 each correspond to a different server that can be managed. In the example of FIG. 1, the tab 104A corresponding to server 1 may have been selected. As such, a page 106 for this server, and corresponding to the tab 104A, is currently displayed within the GUI 100, within which the user may be permitted to manage the server.

The tab 104A and its corresponding page 106 may have focus. Focus in this respect means that user input made on an input device, such as a pointing device or a keyboard, is sent to the tab 104 and/or its corresponding page 106. By comparison, even if the page 106 is displayed, if the tab 104 and the page 106 do not have focus, then user input made on an input device is not sent to the tab 104 and/or to its corresponding page 106.

The tab groups 102 and the tabs 104 are organized over three (or more) hierarchical levels 108A, 108B, and 108C, which are collectively referred to as the hierarchical levels 108. The hierarchical level 108A is the highest hierarchical level, the hierarchical level 108C is the lowest hierarchical level, and the hierarchical level 108B is the second lowest hierarchical level. The hierarchical level 108B is also the second highest hierarchical level in the example of FIG. 1.

The lowest hierarchical level 108C corresponds to the tabs 104. The hierarchical levels 108A and 108B, by comparison, correspond to the tab groups 102. The tab groups 102 within the second lowest hierarchical level 108B each directly encompasses one or more of the tabs 104. Directly encompassing in this respect means that the tab groups 102 within the hierarchical level 108B are in the hierarchical level that is immediately above the lowest hierarchical level 108C. As such, the tab group 102C directly encompasses the tabs 104A, 104B, and 104C; the tab group 102D directly encompasses the tabs 104D and 104E; and, the tab group 102E directly encompasses the tabs 104F and 104G.

The tab groups 102 within the highest hierarchical level 108A each directly encompass one or more other tab groups 102 within the second highest hierarchical level 108B (which is also the second lowest hierarchical level where there are just three hierarchical levels 108, as in FIG. 1). Directly encompassing in this respect means that the tab groups 102 within the hierarchical level 108A are in the hierarchical level that is immediately above the second highest hierarchical level 108B. As such, the tab group 102A directly encompasses the tabs groups 102C and 102D, and the tab group 102A directly encompasses the tab group 102E.

The tab groups 102 within the highest hierarchical level 108A each indirectly encompass one or more tabs 104, and where there are at least four hierarchical levels 108, can indirectly encompass one or more other tab groups within hierarchical levels below the second highest hierarchical level 108B. Indirectly encompassing in this respect means that the tab groups 102 within the hierarchical level 108A are in the hierarchical level that is above, but not immediately above, any other hierarchical level 108 other than the second highest hierarchical level 108B, such as the lowest hierarchical level 108C. As such, the tab group 102A indirectly encompasses the tabs 104A, 104B, 104C, 104D, and 104E, and the tab group 108A indirectly encompasses the tabs 104F and 104G.

The GUI 100 includes tab headers in accordance with the hierarchical levels 108, where each tab header corresponds to one of the tab groups 102 or to one of the tabs 104. The tab headers include labels, such as include text and/or graphics. In the example of FIG. 1, the tab headers include labels that are text. The tab header for the tab group 102A is "DOMAIN A"; the tab header for the tab group 102B is "DOMAIN B"; the tab header for the tab group 102D is "CHASSIS A1"; the tab header for the tab group 102D is "CHASSIS A2"; and, the tab header for the tab group 102E is "CHASSIS B". The tab headers for the tabs 104 are "SERVER 1"; SERVER 2"; "SERVER 3"; "SERVER 4"; "SERVER 5"; "SERVER 6"; and, "SERVER 7", respectively.

In the example of FIG. 1, all of the tab headers for the tab groups 102 and the tabs 104 are displayed, regardless of which tab 104 currently has focus, and regardless of which tab 104 and/or which tab group 102 has been selected. In this example, then, the user is able to quickly discern how the servers corresponding to the tabs 104 are organized within the tab groups 102, by glancing at the tab headers. For instance, the user can quickly discern that domain A encompasses chasses A1 and A2, that chassis A1 encompasses servers 1, 2, and 3, and that chassis A2 encompasses servers 4 and 5. The user can similarly quickly discern that domain B encompasses just chassis B, and that chassis B encompasses servers 6 and 7.

A user can select a tab 104 or a tab group 102 in general in one of two different ways. First, the user can position a pointer over a desired tab 104 or tab group 102 using a suitable pointing device, like a mouse, arrow keys, finger (with a touchpad), and so on. In this first selection manner, the user does not have to actuate the pointing device, such as by clicking a button on the pointing device, to select the desired tab 104 or tab group 102. This first selection manner can be referred to as hovering or flyover. Second, the user can position the pointer over the desired tab 104 or tab group 102 using a suitable pointing device, and then actuating the pointing device once or twice while the pointer is so positioned. This second selection can be referred to as clicking, such as single-clicking or double-clicking.

When the user selects a given tab 104, the page 106 for the server corresponding to the given tab 104 can be displayed in the example of FIG. 1, and may or may not receive focus. When a user selects a given tab group 102, the page 106 for the server corresponding to one of the tabs 104 indirectly or directly encompassed by the given tab group 102 may be displayed in the example of FIG. 1, and may or may not receive focus. For instance, if the user selects the tab group 102D, the page 106 for server 1 corresponding to the left-most tab 104A encompassed by the tab group 102D may be displayed. As another example, if the user selects the tab group 102B, the page 106 for server 6 corresponding to the left-most tab 104F encompassed by the tab group 102B may be displayed.

Referring next to FIG. 2, the GUI 100 includes the tabs 104, and the page 106 corresponding to the selected tab 104A, as before. However, rather than the GUI 100 including the tab groups 102 per se, as in FIG. 1, the GUI 100 includes corresponding slimmer tab groups 102A', 102B', 102C', 102D', and 102E', which are collectively referred to as the slimmer tab groups 102'. The slimmer tab groups 102' of FIG. 2 are smaller, at least in height, than the corresponding tab groups 102 of FIG. 1. The slimmer tab groups 102' of FIG. 2, thus include slimmer versions of the tab headers than the tab groups 102 of FIG. 1 do. Specifically, the labels of the tab headers are not displayed for the slimmer tab groups 102'. As before, the slimmer tab groups 102' and the tabs 104 organized over the hierarchical levels 108. The height of each tab hierarchy can in some implementations be reduced to just a limited number of pixels—even just one or two—in height, to conserve as much screen space as possible, while still providing the user with a sense of the containing hierarchical relationships and groups.

As such, when screen real estate is an issue, displaying the slimmer tab groups 102' in lieu of the tab groups 102 ensures that more screen real estate can be used to display the page 106 itself. However, the user is still able to quickly discern the overall organization of the slimmer tab groups 102' and the tabs 104. This is because the slimmer tab group 102A' is depicted as directly encompassing the slimmer tab groups 102C' and 102D', and the slimmer tab group 102B' is depicted as directly encompassing the slimmer tab group 102E'. Similarly, the slimmer tab group 102C' is depicted as directly encompassing the tabs 104A, 104B, and 104C, the slimmer tab group 102D' is depicted as directly encompassing the tabs 104D and 104E, and the slimmer tab group 102E' is depicted as directly encompassing the tabs 104F and 104G.

FIG. 2 shows the GUI 100 in the case where the user is not selecting any of the slimmer tab groups 102'. When the user selects a slimmer tab group 102', such as in one of the selection manners noted above, for instance, one of two things may occur. First, just the selected slimmer tab group 102' may be expanded to reveal the full version of its corresponding tab header, including the label thereof. As such, the selected slimmer tab group 102' effectively is replaced by its corresponding tab group 102. For example, if the user were to select the slimmer tab group 102A', then the label of the tab header "DOMAIN A" would be displayed, such that the tab group 102A effectively replaces the slimmer tab group 102A'. In this scenario, no other of the slimmer tab groups 102' are expanded or replaced by their corresponding tab groups 102.

Second, the selected slimmer tab group 102' and any other slimmer tab groups 102' that the selected slimmer tab group 102' directly or indirectly encompasses may each be expanded to reveal the full version of its corresponding tab header, including the label thereof. Such slimmer tab groups 102' are thus effectively replaced by their corresponding tab groups 102. For example, if the user were to select the slimmer tab group 102B', then the label of the tab header "DOMAIN B" would be displayed, such that the tab group 102B effectively replaces the slimmer tab group 102B'. Furthermore, then the label of the tab header "CHASSIS B" would be displayed for the slimmer tab group 102E' that the selected slimmer tab group 102B' encompasses, such that the tab group 102E effectively replaces the slimmer tab group 102E'.

Referring finally to FIG. 3, the GUI 100 includes the tab groups 102A and 102B, the slimmer tab groups 102C', 102D', and 102E', and the page 106. The GUI 100 further includes, rather than the tabs 104 as in FIGS. 1 and 2, corresponding slimmer tabs 104A', 104B', 104C', 104D', 104E', 104F', and 104G', which are collectively referred to as the slimmer tabs 104'. The slimmer tabs 104' of FIG. 3 are smaller, at least in height, than the corresponding tabs 104 of FIGS. 1 and 2. The slimmer tabs' 104' of FIG. 3 do not include full versions of the tab headers like the tabs 104' of FIGS. 1 and 2 do, and therefore the labels of the tab headers are not displayed within the slimmer tabs 104'. As before, the tab groups 102, the slimmer tab groups 102', and the slimmer tabs' 104 are organized over the hierarchical levels 108.

As such, in FIG. 3 as in FIG. 2, when screen real estate is an issue, displaying the slimmer tabs 104' and the slimmer tab groups 102' in lieu of the full versions of the tabs 104 and the tab groups 102 in question ensures that more screen real estate can be used to display the page 106 itself. As in FIG. 2, however, the user is still able to quickly discern the overall organization of the tab groups 102, the slimmer tab groups 102', and the slimmer tabs 104'. The difference between FIGS. 2 and 3 is that in the former, just the full versions of the tabs 104 within the lowest hierarchical level 108C are displayed, whereas in the latter, just the full versions of the tab groups 102 within the highest hierarchical level 108A are displayed. The user can thus in relation to FIG. 3 quickly discern the identities of the top-level tab groups 102 within the highest hierarchical level 108A, whereas in FIG. 2 the user can quickly discern the identities of the tabs 104 within the lowest hierarchical level 108C.

FIG. 3 shows the GUI 100 in the case where the user is not selecting any of the slimmer tab groups 102' or any of the slimmer tabs 104'. When the user selects a slimmer tab group 102', such as in one of the selection manners noted above, for instance, one of two things may occur. First, just the selected slimmer tab group 102' may be expanded to reveal the full version of its corresponding tab header, including the label thereof. As such, the selected slimmer tab group 102' effectively is replaced by its corresponding tab group 102. For example, if the user were to select the slimmer tab group 102C', then the label of the tab header "CHASSIS A1" would be displayed, such that the tab group 102C effectively replaces the slimmer tab group 102C'. In this scenario, no other of the slimmer tab groups 102' are expanded or replaced by their corresponding tab groups 102, and none of the slimmer tabs 104' are expanded or replaced by their corresponding tabs 104.

Second, the selected slimmer tab group 102', any other slimmer tab groups 102' that the selected slimmer tab group 102' directly or indirectly encompasses, and the slimmer tabs 104' that the selected slimmer tab group 102' directly or indirectly encompasses may each be expanded to reveal the full version of its corresponding tab header, including the label thereof. Such slimmer tab groups 102' are thus effectively replaced by their corresponding tab groups 102, and such slimmer tabs 104' are effectively replaced by their corresponding tabs 104. For example, if the user were to select the slimmer tab group 102D', then the label of the tab header "CHASSIS A2" would be displayed, such that the tab group 102D effectively replaces the slimmer tab group 102D'. Furthermore, the labels of the tab headers "SERVER 4" and "SERVER 5" would be displayed for the slimmer tabs 104D' and 104E', respectively, which the selected slimmer tab group 102D' encompasses, such that the tabs 104D and 104E effectively replace the slimmer tabs 104D' and 104E'.

When the user selects a slimmer tab 104', as opposed to a slimmer tab group 102', such as in one of the selection manners noted above, for instance, the selected slimmer tab 104' is expanded to reveal the full version of its corresponding tab header, including the label thereof. As such, the selected slimmer tab 104' effectively is replaced by its corresponding tab 104. For example, if the user were to select the slimmer tab 104B', then the label of the tab header "SERVER 2" would be displayed, such that the tab 104B effectively replaces the slimmer tab 104B'. The page 106 corresponding to the tab 104B may further be displayed, depending, for instance, on how the slimmer tab 104B' was selected, such as by hovering or flyover, or by a single-click or a double-click.

In addition, the tab slimmer tab groups 102' that indirectly or directly encompass the selected slimmer tab 104' may be expanded to reveal the full versions of their corresponding tab headers, including the labels thereof. For example, if the user were to select the slimmer tab 104B', then the label of the tab header "SERVER 2" would be displayed, such that the tab 104B effectively replaces the slimmer tab 104B', as before. However, the slimmer tab group 102C' that encompasses the slimmer tab 104B' may also be expanded to display the label of the tab header "CHASSIS A1," such that the tab group 102C effectively replaces the slimmer tab group 102C'.

Alternatively, once a slimmer tab 104' has been selected, the tab groups 102 and the slimmer tab groups 102' may no longer be displayed, to further increase the screen real estate available for the page 106 corresponding to the full version of the tab 104' that effectively replaces the slimmer tab 104'. In this case, the full versions of the tab headers for all the slimmer tabs 104' may also be displayed, and not just for the selected slimmer tab 104', such that tabs 104 effectively replace the slimmer tabs 104'. For example, if the user were to select the slimmer tab 104B', then the tab groups 102 within the hierarchical level 108A and the slimmer tab groups 102' within the hierarchical level 108B are no longer displayed. Furthermore, either just the slimmer tab 104B' is expanded, or all the slimmer tabs 104' within the hierarchical level 108C are expanded.

In a variation of FIG. 3, initially just the tab groups 102 within the highest hierarchical level 108A may be displayed within the GUI 100. When the user selects a given tab group 102 within the hierarchical level 108A, the tab groups 102 within the other hierarchical levels 108 and the tabs 104 within the lowest hierarchical level 108C are then displayed. In this scenario, either the slimmer tab groups 102' within the other hierarchical levels 108, and/or the slimmer tabs 104' within the lowest hierarchical level 108C may first be displayed responsive to selection of a given tab group 102 within the highest hierarchical level 108A. Subsequent selection of a slimmer tab group 102' or a slimmer tab 104' may result in expansion thereof, as described above.

FIG. 4 shows a method 400, according to an embodiment of the invention. A computing device, such as a processor thereof, performs the method 400. The method 400 is performed in relation to tabs of a computer program running on the computing device. As noted above, examples of such computer programs include operating systems, as well as application programs like web-browsing programs and systems management programs, among other types of application programs and other computer programs.

Tabs are organized within tab groups, and the tabs and the tab groups are organized over hierarchical levels (402). Examples of different manners by which such organization can be achieved are presented later in the detailed description. Tab headers corresponding to the tabs and the tab groups are displayed in accordance with the hierarchical levels (404), such as has been described above in relation to FIGS. 1-3. Similar and other examples of manners by which the tab headers can be displayed are also presented later in the detailed description.

Figure 7:
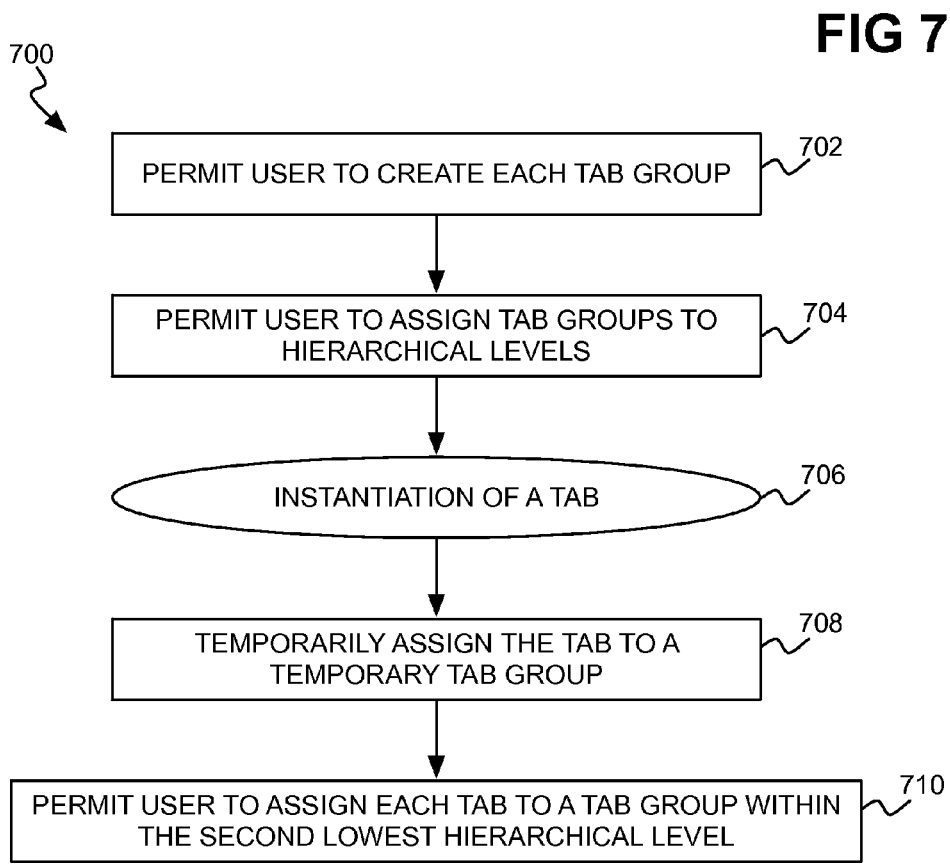

FIGS. 5, 6, and 7 show three different approaches as to how tabs can be organized within tab groups in part 402 of the method 400, and how tabs and tab groups can be organized over hierarchical levels, according to varying embodiments of the invention. As with FIGS. 1, 2, and 3, while a number of different and separate examples are shown in and described in relation to FIGS. 5, 6, and 7, the examples can be combined in various ways. That is, different embodiments of the invention may employ different parts of different ones of the examples of FIGS. 5, 6, and 7.

Referring first to FIG. 5, a method 500 is performed responsive to the instantiation of a tab (502). For instance, a user may cause the computer program to create the tab, or the computer program may create the tab without direct user interaction. The tab is added to the existing set of tabs (504), if any. Metadata of the tab is then inspected (506). For instance, the metadata may identify, for each hierarchical level except the lowest hierarchical level, a tab group at that hierarchical level and that directly or indirectly encompasses the tab. For example, tabs representing servers running an application named "application", or being administered by an admin named "Mark", could have those key names in their metatags (e.g., "app=application, admin=Mark). Such metatags would then allow the GUI to dynamically create corresponding group tabs and appropriately place the server tabs under them.

As such, the following is performed for each hierarchical level, from the highest hierarchical level to the second lowest hierarchical level (508). It is determined whether the existing set of tab groups, if any, include the tab group at the hierarchical level that directly or indirectly encompasses the tab (510), as identified in the metadata of the tab. If not, then the tab group is added to the existing set of tab groups (512). In the method 500, then, the organization of the tabs within the tab groups, and the tabs and the tab groups over the hierarchical levels, is achieved as tabs are added, and as tab groups for the tabs are added.

For example, there initially may not be any tabs or tab groups. The tab 104A for server 1 in FIG. 1 may then be instantiated. The tab 104A is added to the set of existing tabs, and indeed becomes the first member of this set. Inspection of the metadata for the tab 104A identifies that at the hierarchical level 108B, server 1 is part of the tab group 102C corresponding to chassis A1 in FIG. 1, and at the hierarchical level 108A is part of the tab group 102A corresponding to domain A in FIG. 1. At the hierarchical level 108A, then, the tab group 102A is added to the set of tab groups, and at the hierarchical level 108B, the tab group 102C is added to the set of tab groups.

The tab 104D for server 4 in FIG. 1 may then be instantiated. The tab 104D is added to the set of existing tabs, and becomes the second member of this set. Inspection of the metadata for the tab 104D identifies that at the hierarchical level 108B, server 4 is part of the tab group 102D corresponding to chassis A2 in FIG. 1, and at the hierarchical level 108A is part of the tab group 102A corresponding to domain A in FIG. 1. No tab group is added at the hierarchical level 108A, because the tab group 102A has already been added. However, at the hierarchical level 108B, the tab group 102D is added to the set of tab groups, because it has not yet been added.

The tab groups in relation to which the method 500 of FIG. 5 is typically performed can be static. That is, to which tab groups each tab belongs may be relatively permanent and unchanging, and is dictated by the metadata of the tabs. However, it is noted that the underlying metadata per tab instance could be dynamically changing. For instance, a blader server may be placed into another change that is configured to run a different set of applications, and administrated by a different user, resulting in corresponding changes to the server's metadata. The metadata of the tabs further implicitly and/or explicitly identifies the hierarchical structure of the tab groups and the tabs over the hierarchical levels.

For instance, in the example that has been described, the metadata for the tab 104A identifies that there are two hierarchical levels 108 over which the tab groups 102 are organized: the highest hierarchical level 108A including the tab group 102A, and the hierarchical level 108B including the tab group 102C. Similarly, the metadata for the tab 104D identifies the same two hierarchical levels 108, where the hierarchical level 108A again includes the tab group 102A, and that the hierarchical level 108B includes the tab group 102D. That is, the metadata for each tab 104 identifies the hierarchical levels 108 over which the tab groups 102 are organized, and identifies the specific tab groups 102 that directly or indirectly encompass the tab 104 in question.

Referring next to FIG. 6, another method 600 is depicted that provides for a more dynamic approach to organizing tabs within tab groups, although the hierarchical structure of the tab groups themselves may be static. The method 600 does not use metadata that has been pre-assigned to each tab, in contradistinction to the method 500 of FIG. 5. Rather, the method 600 is periodically performed for each tab, to determine a characteristic of the tab (602) that can be dynamic.

For instance, the characteristic of a tab may indicate when the tab was created or instantiated, last accessed, or last active. The last access of a tab specifies when the user most recently selected the tab and/or when the tab most recently received focus. The last activity of a tab specifies when information displayed on the tab most recently changed. The tab groups may correspond to time periods at increasing granularity over the hierarchical levels, starting at the highest hierarchical level. For example, the tab groups within the highest hierarchical level may correspond to years, the tab groups within the second highest hierarchical level may correspond to months, the tab groups within the third highest hierarchical level may correspond to days, and the tab groups within the fourth highest hierarchical level may correspond to hours.

The characteristic of a tab may alternatively indicate how often the tab has been accessed, or has been active. The tab groups in this case may correspond to numerical ranges, or to qualitative ranges corresponding to numerical ranges, at increasing granularity over the hierarchical levels, starting at the highest hierarchical level. For example, there may be two tab groups within the highest hierarchical level that correspond to "high frequency" and "low frequency." The tab groups within the second highest hierarchical level and that are encompassed by the "high frequency" tab group may further divide such high frequency access or activity into a number of numerical ranges. Similarly, the tab groups within the second highest hierarchical level and that are encompassed by the "low frequency" tab group may further divide such low frequency access or activity into a number of numerical ranges.

The characteristic of a tab may alternatively still indicate the functionality being performed by or in the tab. The functionality may be static, or may be dynamic. In the latter case, the functionality performed by or in a tab may change over time. The tab groups in this case may correspond to qualitative assessments of the types of functionality, where the functionalities are being performed, and so on.

A tab is assigned to the tab group within the second lowest hierarchical level that directly encompasses the tab, based on the tab's characteristic (604). That is, for a given characteristic of a tab, there may be just one tab group within the second lowest hierarchical level that directly encompasses the tab. The tab is thus assigned to this tab group. The tab is implicitly assigned to tab groups within hierarchical levels above the second lowest hierarchical level, because the hierarchical organization of the tab groups over the hierarchical levels has already been determined, and may be preordained.

As an example of the method 600, consider the scenario in which the tab groups are organized by frequency of access. The tab groups at the highest hierarchical level may be "high frequency" and "low frequency." The tab groups at a sole middle hierarchical level that are directly encompassed by the "high frequency" tab group may specify two numerical ranges: ten-to-fifty accesses, and more than fifty accesses. The tab groups at the sole middle hierarchical level that are directly encompassed by the "low frequency" tab group may also specify two numerical ranges: three-to-nine accesses, and less than three accesses.

Each time a user navigates to a particular tab, such as by selecting it and/or by giving the tab focus, the access count for the tab is incremented by one. When the tab is first created, the tab is directly encompassed by the tab group corresponding to less than three accesses, and thus is indirectly encompassed by the "low frequency" tab group. The third time the tab is accessed, the tab then is directly encompassed by the tab group corresponding to three-to-nine accesses, but is still indirectly encompassed by the "low frequency" tab group. The tenth time the tab is accessed, the tab is directly encompassed by the tab group corresponding to ten-to-fifty accesses, and thus is now indirectly encompassed by the "high frequency" tab group. The fifty-first time the tab is accessed, the tab is then directly encompassed by the more than fifty accesses tab group, but is still indirectly encompassed by the "high frequency" tab group.

Therefore, in the method 600, over time the tab groups to which a particular tab belongs can change, depending on the dynamic characteristic of the tab. The organization and display of the tabs vis-à-vis the tab groups thus periodically change, as the tabs move to different tab groups within the second lowest hierarchical level. The organization of the tab groups over the hierarchical levels, from the highest hierarchical level to the second lowest hierarchical level, may not periodically change, however, although the display of the tab groups may change to accommodate the organization of the tabs within the tab groups.

Referring finally to FIG. 7, a third method 700 for organizing tabs within tab groups, and tabs and tab groups over hierarchical levels, is depicted. The method 700 is more manually intensive than the methods 500 and 600 of FIGS. 5 and 6, respectively, are. As such, a user is permitted to create each tab group via a GUI (702), and is likewise permitted to assign tab groups to different hierarchical levels via the GUI (704). Parts 702 and/or 704 may be repeated as desired, so that new tab groups and hierarchical levels can be created, and so that existing tab groups can be organized over the hierarchical levels. That is, in parts 702 and 704, the user determines at which hierarchical level a given tab group is, which tab group, if any, encompasses the given tab group, and which tab group or groups, if any, the given tab group encompasses.

When a tab has been instantiated (706), it may be temporarily be assigned, however, to a temporary tab group (708) outside of the hierarchical levels, until the user has assigned the tab to one of the tab groups at the second lowest hierarchical level. As such, the user is permitted via the GUI to assign each tab to a tab group within the second lowest hierarchical level (710). Part 710 may be repeated as desired, so that a tab may be reassigned from one tab group to another tab group within the second lowest hierarchical level. In some embodiments, once the user has established a tab group organizational structure over hierarchical levels, just the tab groups that directly or indirectly encompass tabs are displayed, and other tab groups are not displayed. When a user is ready to assign tabs to tab groups, all the tab groups may be temporarily displayed, however.

The examples that have been described thus far in the detailed description implicitly assume that a tab can be assigned to just one tab group at the second lowest hierarchical level. However, in other scenarios, a tab may be able to be assigned to more than one tab group at the second lowest hierarchical level. In such situations, the tab may be duplicated, or symbolic or other types of references or links may be created so that the tab is present within more than one tab group at the second lowest hierarchical level.

Figure 8:
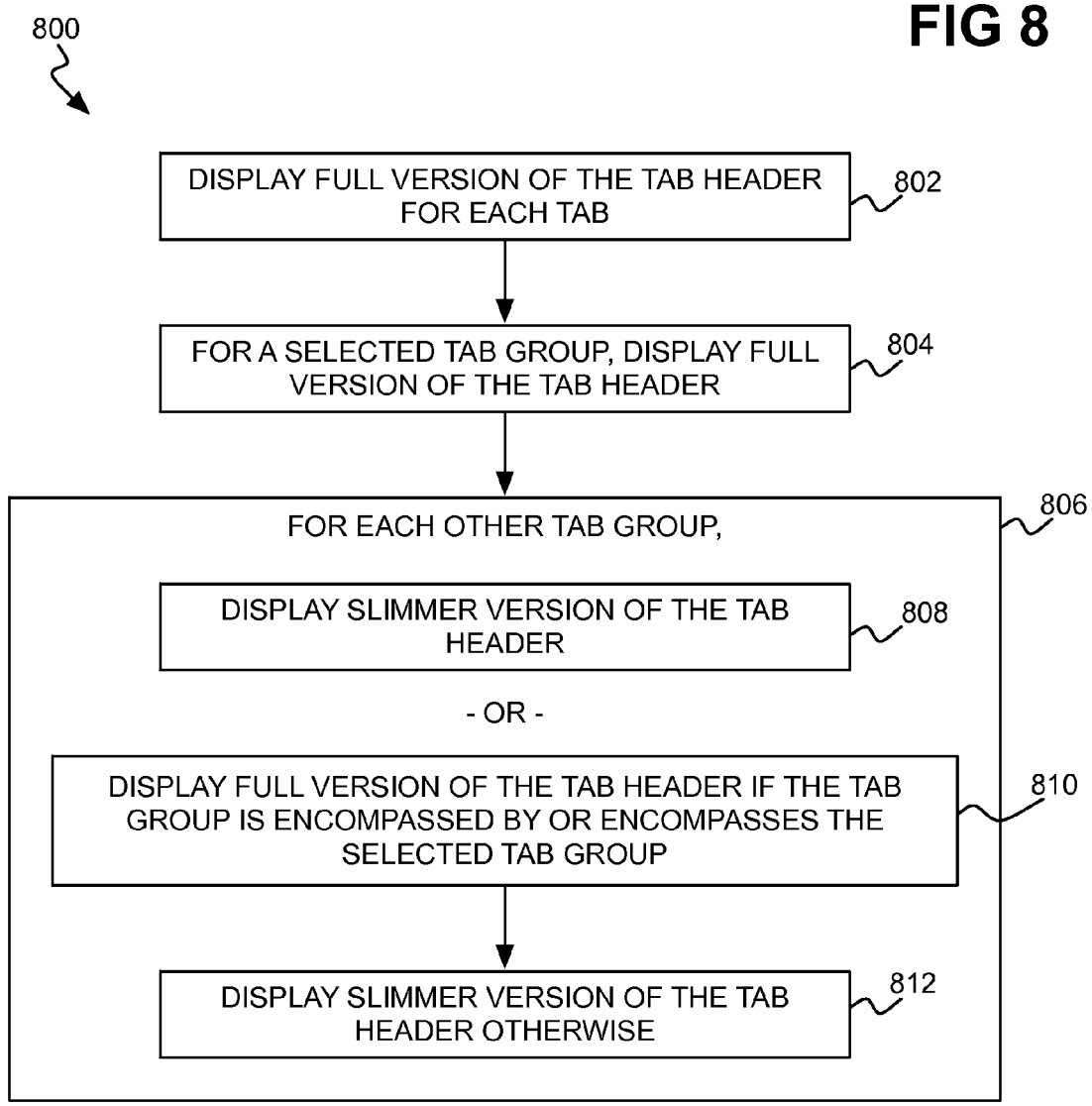
FIGS. 8 and 9 are flowcharts of methods for displaying tab headers for tabs and tab groups in accordance with hierarchical levels, according to varying embodiments of the invention.
Figure 9:
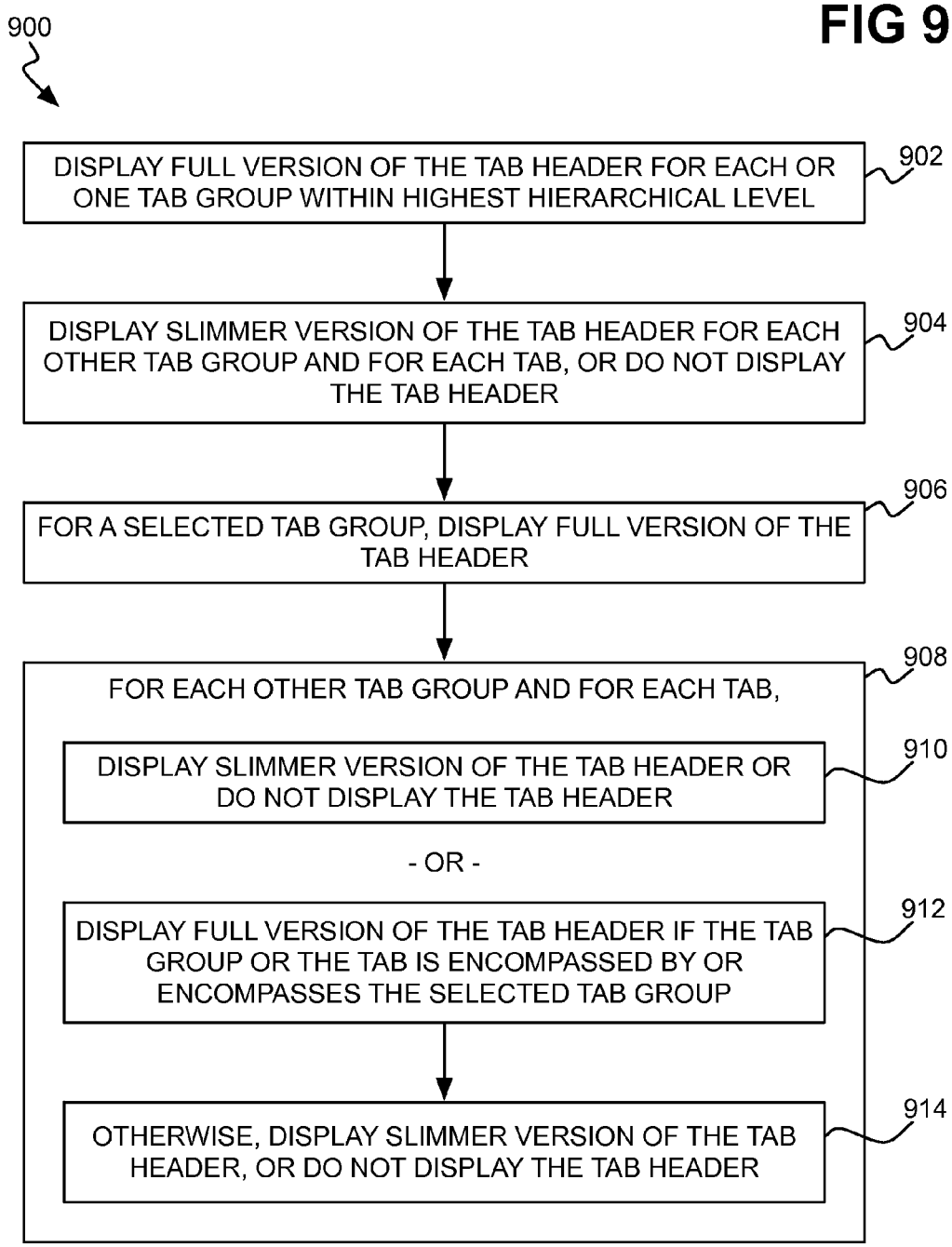

FIGS. 8 and 9 show two different and general approaches as to how tabs and tab groups can be displayed in accordance with the hierarchical levels in part 404 of the method 400 of FIG. 4, according to varying embodiments of the invention. The approaches depicted in FIGS. 8 and 9 can be varied, and yet still be encompassed by part 404 of the method 400. Furthermore, in a basic scenario, the full versions of the tab headers are displayed for all the tab groups and all the tabs, as has been described in relation to FIG. 1, above.

Referring first to FIG. 8, a method 800 is performed to realize at least the example GUI 100 of FIG. 2 that has been described. The full version of the tab header for each tab is displayed (802). For a selected tab group, the full version of the tab header is displayed (804). For each other tab group, one of two approaches may be employed (806). First, the slimmer version of the tab header for each sub tab group may be displayed (808). Second, the full version of the tab header for each tab group that is encompassed by or that encompasses the selected tab group may be displayed (810), and the slimmer version of the tab header for each tab group that is not encompassed by or that does not encompass the selected tab group may be displayed (812).

In practice, it is noted that at some points in time, no tab group may be selected. As such, usually the slimmer versions of the tab headers for all such tab groups are displayed, in accordance with part 808 of the method 800. Thereafter, however, once a tab group has been selected and the full version of its tab header displayed per part 804, either part 808, or parts 810 and 812, may be performed. That is, in such an implementation, when no tab group is selected, then part 808 may be performed for each tab group, and when a tab group is selected, then either part 808 or parts 810 and 812 may be performed for the tab groups other than the selected tab group.

Referring next to FIG. 9, a method 900 is performed to realize at least the example GUI 100 of FIG. 3 that has been described. The full version of the tab header for each tab group, or just one of the tab groups, within the highest hierarchical level is displayed (902). With respect to the tabs and the other tab groups, either the slimmer version of their tab headers are displayed, or none of their tab headers are displayed (i.e., the tab header is not displayed in any manner) (904). At some point, a tab group, such as a tab group within the highest hierarchical level, is selected (for instance, the tab header thereof may be selected). The full version of the tab header of this selected tab group is displayed, if it is not already (906).

For each other tab group, and for each tab, one of two approaches may be employed (908). First, the slimmer version of the tab header for such a tab group or tab may be displayed, or no tab header may be displayed (910). Second, the full version of the tab header may be displayed if the tab group or tab in question is encompassed by or encompasses the selected tab group (912), and the slimmer version of the tab header, or no tab header, may be displayed if the tab group or tab is not encompassed by or does not encompass the selected tab group (914).

Figure 10:
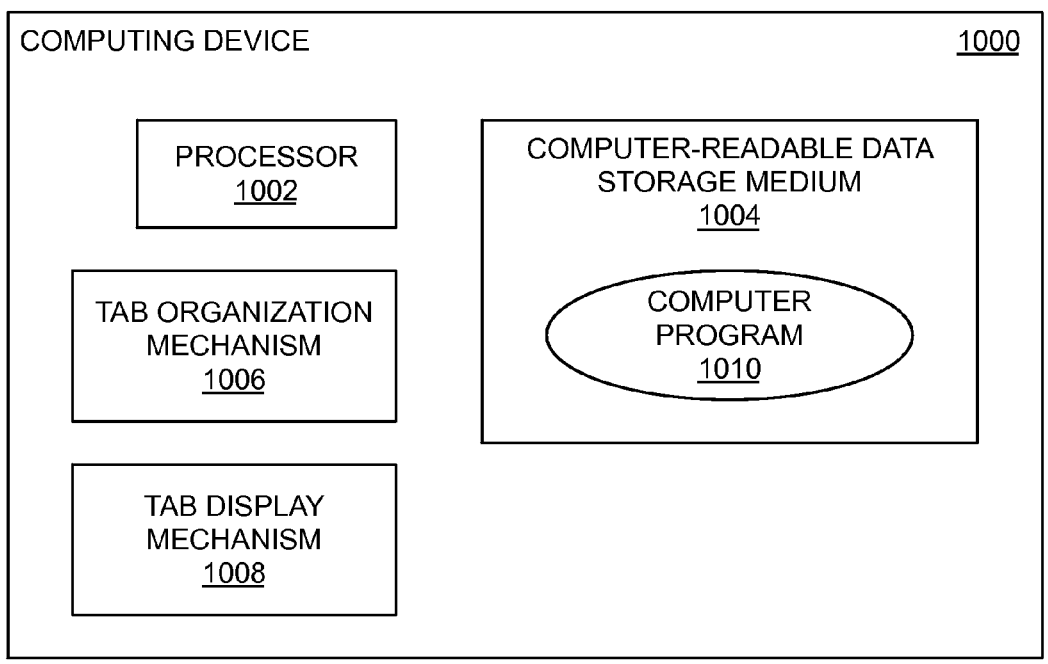
FIG. 10 is a diagram of a rudimentary but representative computing device, according to an embodiment of the invention.

FIG. 10 shows a computing device 1000, according to an embodiment of the invention. The computing device 1000 includes at least a processor 1002, a computer-readable data storage medium 1004, a tab organization mechanism 1006, and a tab display mechanism 1008. The computing device 1000 typically includes other hardware and software components as well, such as input devices, communication hardware, and so on.

The computer-readable data storage medium stores a computer program 1010. The processor 1002 executes the computer program 1010. The computer program 1010 is said to have a number of tabs organized or organizable over a number of tab groups in accordance with a number of hierarchical levels, as has been described.

The mechanisms 1006 and 1008 may each be implemented as software, hardware, or a combination of software and hardware. For instance, the mechanisms 1006 and 1008 may each be processor-executable code of the same or a different computer program, which also may be stored on the computer-readable data storage medium 1004, and which is executable by the processor 1002. In this sense, the mechanisms 1006 and 1008 may be said to be implemented at least in hardware as well, insofar as the mechanisms 1006 and 1008 are effectuated via execution of code stored on one hardware component, the computer-readable data storage medium 1004, by another hardware component, the processor 1002.

The mechanism 1006 is a tab organization mechanism that performs part 402 of the method 400 of FIG. 4 that has been described. The mechanism 1008 is a tab display mechanism that performs part 404 of the method 400. As such, the mechanisms 1006 and 1008 can interact with one another to achieve the GUI 100 of FIGS. 1, 2, and 3, pursuant to the methods 500, 600, 700, 800, and 900 of FIGS. 5, 6, 7, 8, and 9.

Those of ordinary skill within the art can appreciate that a system, method, or computer program product may embody aspects of the present disclosure. Accordingly, aspects of the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product that one or more computer readable medium(s) embody. The computer readable medium(s) may embody computer readable program code.

Those of ordinary skill within the art can utilize any combination of one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. An appropriate medium may transmit program code embodied on a computer readable medium. Such appropriate media include but are not limited to wireless, wireline, optical fiber cable, RF, etc., or any suitable combination of the foregoing.

In general, a computer program product includes a computer-readable medium on which one or more computer programs are stored. One or more processors of one or more hardware devices execute the computer programs from the computer-readable medium to perform a method. For instance, the processors may perform one or more of the methods that have been described above.

The computer programs themselves include computer program code. Those of ordinary skill within the art may write computer program code for carrying out operations for aspects of the present disclosure in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, any type of network may connect the remote computer to the user's computer. Such networks include a local area network (LAN) or a wide area network (WAN), or a connection may to an external computer (for example, through the Internet using an Internet Service Provider).

The detailed description has presented aspects of the present disclosure with reference to flowchart illustrations and/or block diagrams of methods, apparatus (systems) and computer program products according to embodiments of the disclosure. Those of ordinary skill within the art can understand that computer program instructions can implement each block of the flowchart illustrations and/or block diagrams, and combinations of blocks in the flowchart illustrations and/or block diagrams. Providing these instructions to a processor of a general purpose computer, special purpose computer, or other programmable data processing apparatus to produce a machine, can result in execution of the instructions via the processor of the computer or other programmable data processing apparatus, to create means for implementing the functions/acts specified in the flowchart and/or block diagram block or blocks.

A computer readable medium may also store these instruction to direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Those of ordinary skill within the art may also load the computer program instructions onto a computer, other programmable data processing apparatus, or other devices to cause the computer, other programmable apparatus or other devices, to perform a series of operational steps. The result is a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, execution of two blocks shown in succession may, in fact, occur substantially concurrently, or sometimes in the reverse order, depending upon the functionality involved. Special purpose hardware-based systems that perform specified functions or acts, or combinations of special purpose hardware and computer instructions, can implement each block of the block diagrams and/or flowchart illustration, and combinations of blocks in the block diagrams and/or flowchart illustration.

Although the detailed description has presented specific embodiments, those of ordinary skill in the art can appreciate that they can substitute any arrangement calculated to achieve the same purpose for the specific embodiments shown. This application thus covers any adaptations or variations of embodiments of the present disclosure. As such and therefore, only the claims and equivalents thereof limit this disclosure.

We claim:

1. A method comprising:

organizing, by a computing device, a plurality of tabs of a computer program running on the computing device and a plurality of tab groups within which the tabs are organized over a hierarchy having three or more hierarchical levels, the computer program to manage a plurality of servers organized over a corresponding server hierarchy of server groups culminating in one or more server domains at a top of the corresponding server hierarchy, each tab corresponding to one of the servers, each tab group corresponding to one of the server groups, where a lowest hierarchical level corresponds to the tabs, a second lowest hierarchical level corresponds to the tab groups that each directly encompass a subset of the tabs, and a highest hierarchical level corresponds to the tab groups that each directly encompass a subset of the tab groups lower in the hierarchy, the tab groups of the highest hierarchical level corresponding to the server domains;

displaying, by the computing device, a plurality of tab headers that each correspond to one of the tabs or one of the tab groups, on a screen in a top-down manner in correspondence with the hierarchy, where the tab headers corresponding to the tabs in the lowest hierarchical level are displayed at a bottom of a predetermined area on the screen, the tab headers corresponding to the tab groups in the second lowest hierarchical level are displayed completely above the tab headers corresponding to the tabs in the lowest hierarchical level, and the tab headers corresponding to the tab groups in the highest hierarchical level are displayed completely above the tab headers corresponding to the tabs in the second lowest hierarchical level, where each tab header corresponding to one of the tab groups has a width no less than a total of widths of the tab headers corresponding to the tabs or to the tab groups in the hierarchical level immediately below the one of the tab groups;

reducing, by the computing device, horizontal space occupied by the tab headers on the screen by selectively displaying a full version of each tab header or a slim version of each tab header, the full version of each tab header being greater in height than the slim version of each tab header; and managing, by the computing device, under the control of an administrator, the servers via interactive selection of the tab headers, where a current server of the servers is displayed and is managed by the administrator upon selection of the tab to which the server corresponds, wherein reducing the horizontal space occupied by the tab headers comprises:

displaying the full version of each tab header corresponding to one of the tab groups within the highest hierarchical level and displaying the slim version of each tab header corresponding to one of the tab groups not within the highest hierarchical level or to one of the tabs;

as an entry point of the method, responsive to user selection of a given tab header being selected, displaying the full version of the given tab header and displaying the slim version of each tab header other than the given tab header; and repeating the method at the entry point as different user selections of different given tab headers are made.

2. The method of claim 1, wherein the full version of each tab header includes text labeling the tab header, and the slim version of each tab header does not include the text.

3. The method of claim 1, wherein the full version of each tab header includes both graphics and text labeling the tab header, and the slim version of each tab header does not include both the graphics and the text.

4. The method of claim 1, wherein organizing the tabs comprises retrieving the corresponding server hierarchy over which the servers are organized among the server groups culminating in the one or more server domains, creating the tabs in correspondence with the server, creating the tab groups in correspondence with the server groups, generating the hierarchy in correspondence with the server hierarchy, and organizing the tabs and the tab groups in correspondence with the hierarchy.

5. A computing device comprising:
a processor; and
a non-transitory computer-readable data storage medium to store a computer executable by the processor, wherein the computer program is to:
organize a plurality of tabs and a plurality of tab groups within which the tabs are organized over a hierarchy having three or more hierarchical levels, the computer program to manage a plurality of servers organized over a corresponding server hierarchy of server groups culminating in one or more server domains at a top of the corresponding server hierarchy, each tab corresponding to one of the servers, each tab group corresponding to one of the server groups, where a lowest hierarchical level corresponds to the tabs, a second lowest hierarchical level corresponds to the tab groups that each directly encompass a subset of the tabs, and a highest hierarchical level corresponds to the tab groups that each directly encompass a subset of the tab groups lower in the hierarchy, the tab groups of the highest hierarchical level corresponding to the server domains;

display a plurality of tab headers that each correspond to one of the tabs or one of the tab groups, on a screen in a top-down manner in correspondence with the hierarchy, where the tab headers corresponding to the tabs in the lowest hierarchical level are displayed at a bottom of a predetermined area on the screen, the tab headers corresponding to the tab groups in the second lowest hierarchical level are displayed completely above the tab headers corresponding to the tabs in the lowest hierarchical level, and the tab headers corresponding to the tab groups in the highest hierarchical level are displayed completely above the tab headers corresponding to the tabs in the second lowest hierarchical level, where each tab header corresponding to one of the tab groups has a width no less than a total of widths of the tab headers corresponding to the tabs or to the tab groups in the hierarchical level immediately below the one of the tab groups;

reduce horizontal space occupied by the tab headers on the screen by selectively displaying a full version of each tab header or a slim version of each tab header, the full version of each tab header being greater in height than the slim version of each tab header; and manage, under the control of an administrator, the servers via interactive selection of the tab headers, where a current server of the servers is displayed and is managed by the administrator upon selection of the tab to which the server corresponds, wherein the horizontal space occupied by the tab headers is reduced by:

displaying the full version of each tab header corresponding to one of the tab groups within the highest hierarchical level and displaying the slim version of each tab header corresponding to one of the tab groups not within the highest hierarchical level or to one of the tabs;

as an entry point, responsive to user selection of a given tab header being selected, displaying the full version of the given tab header and displaying the slim version of each tab header other than the given tab header; and proceeding back to the entry point as different user selections of different given tab headers are made.

6. The computing device of claim 5, wherein the full version of each tab header includes text labeling the tab header, and the slim version of each tab header does not include the text.

7. The computing device of claim 5, wherein the full version of each tab header includes both graphics and text labeling the tab header, and the slim version of each tab header does not include both the graphics and the text.

8. The computing device of claim 5, wherein the tabs are organized by retrieving the corresponding server hierarchy over which the servers are organized among the server groups culminating in the one or more server domains, creating the tabs in correspondence with the server, creating the tab groups in correspondence with the server groups, generating the hierarchy in correspondence with the server hierarchy, and organizing the tabs and the tab groups in correspondence with the hierarchy.

9. A non-transitory computer program product comprising a storage device storing a computer program executable by a processor of a computing device to perform a method comprising:

organizing a plurality of tabs of a computer program running on the computing device and a plurality of tab groups within which the tabs are organized over a hierarchy having three or more hierarchical levels, the computer program to manage a plurality of servers organized over a corresponding server hierarchy of server groups culminating in one or more server domains at a top of the corresponding server hierarchy, each tab corresponding to one of the servers, each tab group corresponding to one of the server groups, where a lowest hierarchical level corresponds to the tabs, a second lowest hierarchical level corresponds to the tab groups that each directly encompass a subset of the tabs, and a highest hierarchical level corresponds to the tab groups that each directly encompass a subset of the tab groups lower in the hierarchy, the tab groups of the highest hierarchical level corresponding to the server domains;

displaying a plurality of tab headers that each correspond to one of the tabs or one of the tab groups, on a screen in a top-down manner in correspondence with the hierarchy, where the tab headers corresponding to the tabs in the lowest hierarchical level are displayed at a bottom of a predetermined area on the screen, the tab headers corresponding to the tab groups in the second lowest hierarchical level are displayed completely above the tab headers corresponding to the tabs in the lowest hierarchical level, and the tab headers corresponding to the tab groups in the highest hierarchical level are displayed completely above the tab headers corresponding to the tabs in the second lowest hierarchical level, where each tab header corresponding to one of the tab groups has a width no less than a total of widths of the tab headers corresponding to the tabs or to the tab groups in the hierarchical level immediately below the one of the tab groups;

reducing horizontal space occupied by the tab headers on the screen by selectively displaying a full version of each tab header or a slim version of each tab header, the full version of each tab header being greater in height than the slim version of each tab header; and managing, under the control of an administrator, the servers via interactive selection of the tab headers, where a current server of the servers is displayed and is managed by the administrator upon selection of the tab to which the server corresponds, wherein reducing the horizontal space occupied by the tab headers comprises:

displaying the full version of each tab header corresponding to one of the tab groups within the highest hierarchical level and displaying the slim version of each tab header corresponding to one of the tab groups not within the highest hierarchical level or to one of the tabs;

as an entry point of the method, responsive to user selection of a given tab header being selected, displaying the full version of the given tab header and displaying the slim version of each tab header other than the given tab header; and repeating the method at the entry point as different user selections of different given tab headers are made.

10. The computer program product of claim 9, wherein the full version of each tab header includes text labeling the tab header, and the slim version of each tab header does not include the text.

11. The computer program product of claim 9, wherein the full version of each tab header includes both graphics and text labeling the tab header, and the slim version of each tab header does not include both the graphics and the text.

12. The computer program product of claim 9, wherein organizing the tabs comprises retrieving the corresponding server hierarchy over which the servers are organized among the server groups culminating in the one or more server domains, creating the tabs in correspondence with the server, creating the tab groups in correspondence with the server groups, generating the hierarchy in correspondence with the server hierarchy, and organizing the tabs and the tab groups in correspondence with the hierarchy.

* * * * *